United States Patent
Spence, Jr.

(10) Patent No.: US 6,860,565 B2
(45) Date of Patent: Mar. 1, 2005

(54) VEHICLE TILT SEAT HANDLE COUPLING

(76) Inventor: Ernest Spence, Jr., 710 Linden Ct., Mount Sterling, KY (US) 40353

( * ) Notice: Subject to any disclaimer, the term of this patent is extended or adjusted under 35 U.S.C. 154(b) by 0 days.

(21) Appl. No.: 10/438,314

(22) Filed: May 14, 2003

(65) Prior Publication Data

US 2004/0004387 A1 Jan. 8, 2004

Related U.S. Application Data

(60) Provisional application No. 60/380,447, filed on May 14, 2002.

(51) Int. Cl.$^7$ .............................................. A47C 31/00
(52) U.S. Cl. ............................... 297/463.1; 297/463.2; 16/DIG. 24
(58) Field of Search .......................... 297/463.1, 463.2; 16/110.1, 111.1, DIG. 24, 422, DIG. 23

(56) References Cited

U.S. PATENT DOCUMENTS

| | | |
|---|---|---|
| 1,167,296 A | 1/1916 | Hallowell |
| 2,311,821 A | 2/1943 | Floraday |
| 3,463,520 A | 8/1969 | Turro |
| 3,582,116 A | 6/1971 | Young |
| 3,806,267 A | 4/1974 | Vining, Jr. |
| 3,851,985 A | 12/1974 | Coleman |
| 4,343,564 A | 8/1982 | Francis |
| 4,436,468 A | 3/1984 | Ozaki et al. |
| 4,529,332 A | 7/1985 | Glabiszewski |
| 4,593,430 A * | 6/1986 | Spangler et al. ........ 16/DIG. 24 |
| 4,790,208 A | 12/1988 | Johnson |
| 5,282,395 A | 2/1994 | LaPointe et al. |
| 5,694,815 A * | 12/1997 | Biber et al. ........ 16/DIG. 24 X |
| 5,887,850 A * | 3/1999 | Ruffalo ....................... 16/110.1 |
| 6,174,031 B1 * | 1/2001 | Lindgren et al. ........ 297/463.1 |
| 2002/0044822 A1 | 4/2002 | Grimmel |

FOREIGN PATENT DOCUMENTS

JP  57186534 A  * 11/1982  ............ B60N/1/06

* cited by examiner

Primary Examiner—Anthony D. Barfield
(74) Attorney, Agent, or Firm—Carrithers Law Office, PLLC; David W. Carrithers

(57) ABSTRACT

A coupling member for connecting a conventional handle to a lock release actuating shaft of an vehicle tilt seat mechanism. The coupling member comprises a relatively short shaft having contiguous first and second portions that are of different outer dimensions transverse to the length of the shaft. The larger one of the first and second portions has a recess extending a selected distance inwardly from a free outer end of such portion in a direction toward the smaller one of the two contiguous portions. Means are provided within the recess for detachably mounting and securely anchoring the coupling member on and to the lock release actuating the shaft for rotating same. The smaller one of the contiguous portions is adapted to project into a socket in the handle for the tilt mechanism, and has means thereon cooperating with means in the socket of the handle for preventing relative movement of the handle and coupling member when the handle is moved in a direction to rotate the lock release actuating shaft.

6 Claims, 4 Drawing Sheets

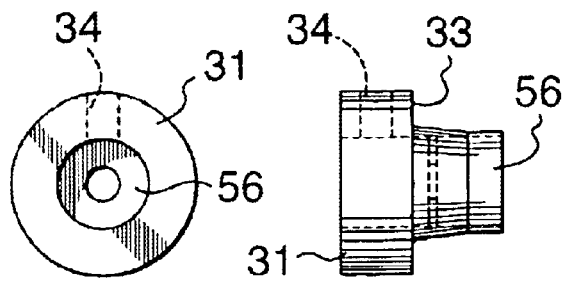
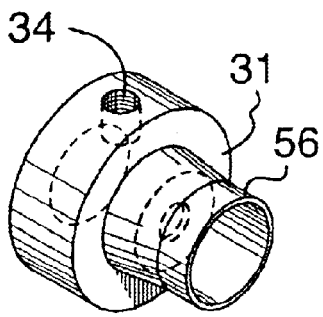
FIG. 10a  FIG. 10b  FIG. 10c
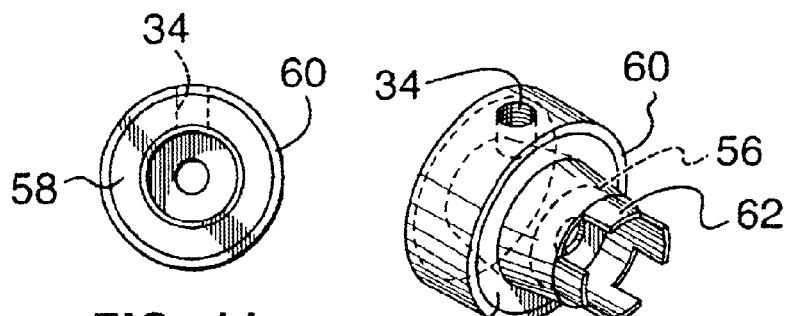
FIG. 11a  FIG. 11b
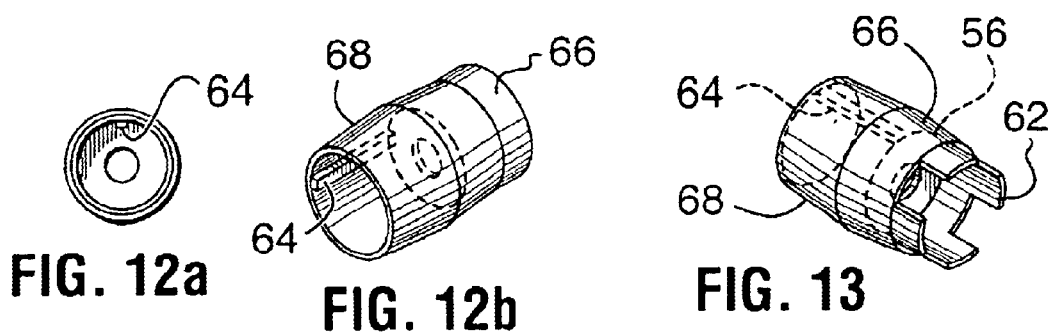
FIG. 12a  FIG. 12b  FIG. 13

VEHICLE TILT SEAT HANDLE COUPLING

This application claims priority from U.S. Provisional Application Ser. No. 60/380,447 filed on May 14, 2001 which is incorporated by reference herein.

BACKGROUND OF THE INVENTION

1. Technical Field

This invention relates generally to vehicle seats having a tilt back that is released from a locked position by a handle on the side of the seat and more particularly to an improved means of connecting the handle to the tilt lock/release shaft of the tilt mechanism.

2. Background Information

Seat recliner mechanisms frequently fail because the shaft that projects from the tilt mechanism and to which the handle is directly attached breaks. The shaft is spring biased to a locking position and without the handle one cannot release the latch to change the tilt of the seat back. When such failure occurs the practice has been to replace the entire recliner mechanism inside the seat as well as the handle that attaches directly thereto. The repair is costly and requires about two hours of labor to install. Also the replacement used is a manufacturer's original equipment part, or similar substitute therefor, and thus is likely to fail again for the same reason as the first i.e. a faulty design.

SUMMARY OF INVENTION

An object of the present invention is to provide a quick inexpensive repair of an vehicle tilt seat mechanism wherein failure of the same has occurred due to a broken shaft that actuates the tilt locking mechanism and onto which the handle can no longer be attached.

A further principal object of the present invention is to provide an original equipment tilt seat mechanisms with a separate coupling member inter-posed between and which connects the handle to the lock release shaft.

In keeping with the foregoing there is provided in accordance with the present invention a coupling member for connecting a conventional handle to a lock release actuating shaft of an vehicle tilt seat mechanism. The coupling member comprising a relatively short shaft having contiguous first and second portions that are of different outer dimensions transverse to the length of the shaft. The larger diameter portion defining a first portion and the smaller diameter portion defining a second portion. The larger portion has a recess forming a bore extending a selected distance inwardly from a free outer end in a direction toward the smaller portion. The recess includes means for detachably mounting and securely anchoring the coupling member on a spindle or shaft, and mounting onto the lock release actuating shaft for rotating the same. The smaller portion is adapted to project into a socket in the handle for the tilt mechanism and has means thereon cooperating engaging means in the socket in the handle for preventing relative movement of the handle and coupling member when the handle is moved in a direction to rotate the lock release actuating shaft.

The present invention provides a means to repair handle assemblies, wherein the shaft has an outer free end portion broken off preventing reconnecting the handle directly to the shaft. In accordance with a further aspect of the present invention, there is provided a method of reconnecting a handle to the lock release shaft of a seat back tilt mechanism on an vehicle seat. The method comprises providing a coupling member for cooperative engagement between a seat handle shaft and the handle. The coupling member includes a cylindrical coupling member having a first end which includes a bore extending from the distal end inwardly a selected distance and a second small end having an external diameter less than the first end. At least a portion of the smaller second end projects into the recess provided in the handle. The remaining portion of the lock release shaft projecting into the recess in the larger first end of the coupling securely anchoring the coupling member to the handle and the shaft.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 10a is a frontal view of an alternate embodiment of a coupling member showing the smaller portion comprising a frustoconical front portion abutting a rear portion with a bore therethrough to cooperatively engage a screw;

FIG. 10b is a side view of the embodiment of FIG. 10a;

FIG. 10c is an isometric view of the embodiments of the coupling member shown in FIGS. 10a and 10b showing the throughbore for cooperatively engaging a screw in phantom lines;

FIG. 11a is a frontal view of an alternate embodiment of a three piece coupling member showing the smaller portion comprising a frustoconical front portion abutting a rear portion of approximately equal size with a bore therethrough to cooperatively engage a screw, wherein a washer comprising a polymeric material extends coaxially around the rear portion and a band extends coaxially around the washer forming the larger portion of the coupling member with a threaded set screw socket disposed through the band, washer, and front portion of the coupling member and the end of the frustoconical portion is castilated forming slots and projections therearound;

FIG. 11b is an isometric view of the embodiment of the coupling member shown in FIG. 11a showing the throughbore for cooperatively engaging a screw in phantom lines;

FIG. 12a is a frontal end view showing a coupling member having a keeper comprising a top spline;

FIG. 12b shows an isometric view of the embodiment of the coupling member wherein the front end portion is approximately the same size as the rear end portion and the rear end portion includes a keeper comprising a spline therein; and FIG. 13 is an isometric view of the embodiment of FIG. 12B including the front truncated portion includes a castilated end.

DESCRIPTION OF THE PREFERRED EMBODIMENTS

Figure 1:
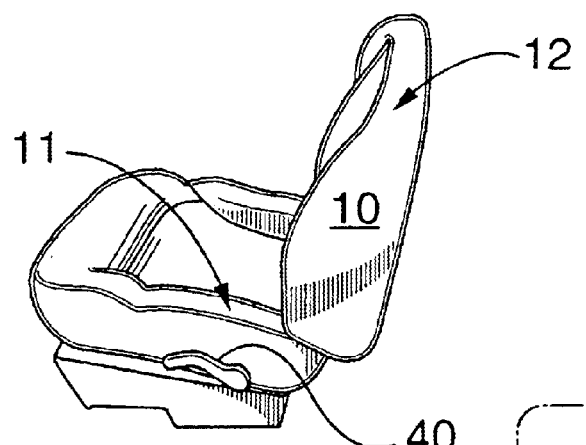
FIG. 1 is a side view of a portion of an vehicle seat having a tilt back and a handle on the side of the seat for releasing the tilt lock mechanism.
Figure 3:
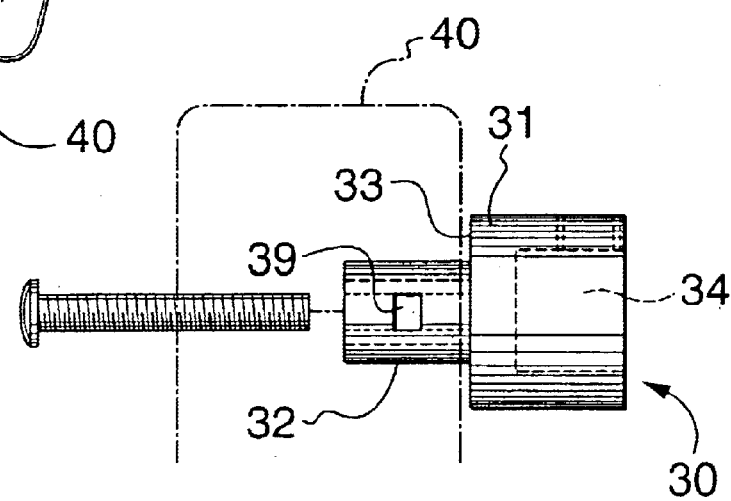
FIG. 3 is a side view of a coupling member provided in accordance with the present invention for attaching a conventional factory replacement handle to the broken shaft illustrate in FIG. 2.

With reference to the drawings, illustrated in FIG. 1 is an vehicle bucket type seat 10 having a seat portion 11 and a back portion 12 that can be moved to various different reclined positions by lifting the free end of a handle 40 to release a locking device on a seat tilt mechanism 20. The handle 40 on the side of the seat attaches to a lock release shaft that is spring biased to a seat back locking position.

Figure 2:
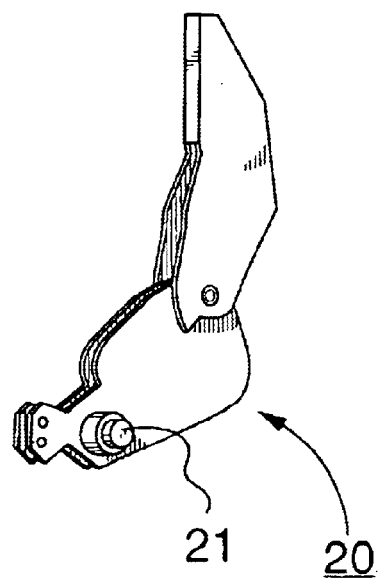
FIG. 2 is an oblique view of the tilt mechanism to which the handle attaches and in which an end portion of a lock release shaft has broken off thereby preventing connecting a handle directly.
Figure 4:
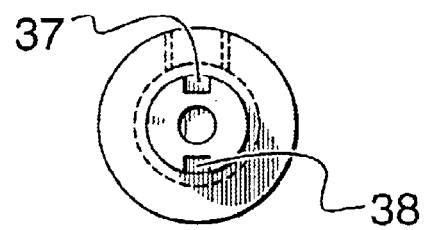
FIG. 4 is a left side view of FIG. 3.
Figure 5:
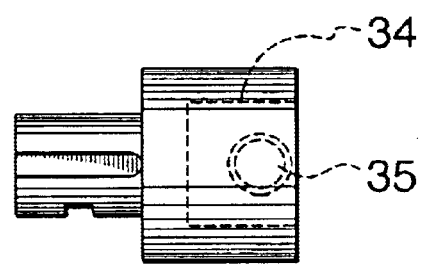
FIG. 5 is a bottom view of FIG. 3.
Figure 6:
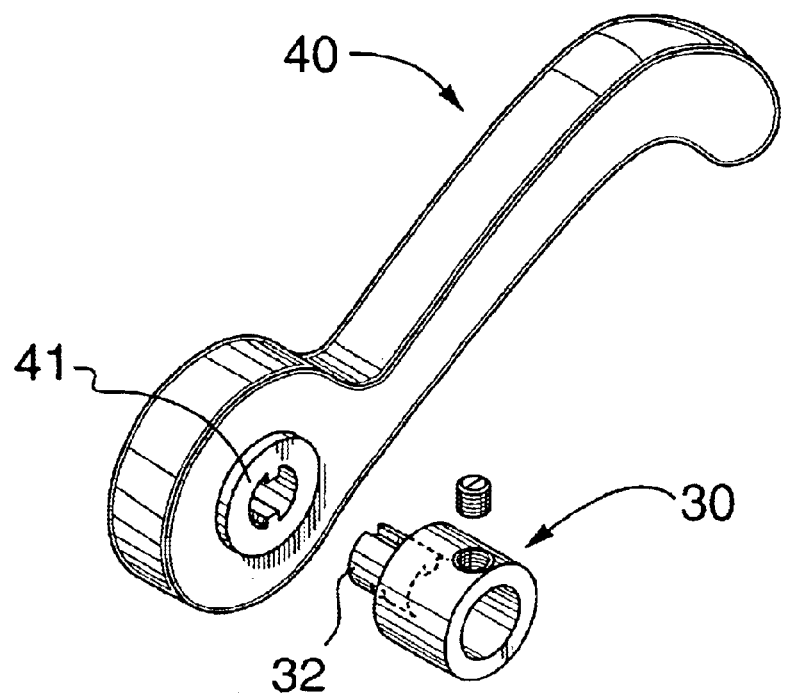
FIG. 6 is an exploded view of a handle, coupling member of the present invention and a tilt mechanism.
Figure 7:
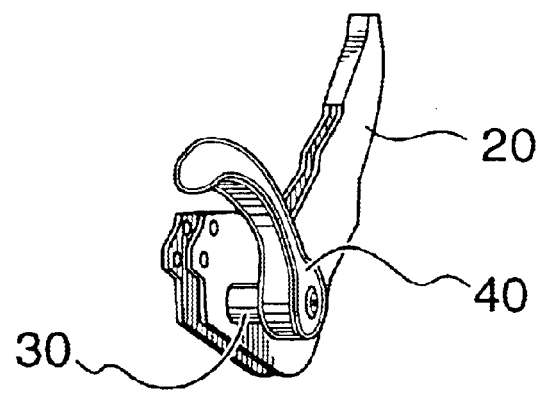
FIG. 7 is an oblique view showing the parts of FIG. 6 in an assembled state in which the handle is attached to the mechanism of FIG. 1 by a coupling member of the present invention shown in FIGS. 3 to 5.

The seat recliner mechanism 20 for the seat of FIG. 1 is shown in FIG. 2 and includes a shaft 21 that projects into a recess, i.e. a socket, in the handle 40 and suitable means such a screw or snap fit connection anchors the handle to the shaft to rotate the same. Rotating the shaft 21 against the force of the spring bias releases the tilt lock mechanism. An end portion of the shaft 21, having a slot or hole therein, is prone to breaking off leaving a short stub shaft projecting from the side of the mechanism. The stub shaft that remains, (shown in FIG. 2), is that much shorter than the original as to make it impossible to connect the handle directly thereto in an operative manner as intended by the manufacturer. In the past when this failure has occurred the practice has been to remove the tilt mechanism and replace it with a new one and then attach a new handle thereto. Replacement time is about 2 hours by someone trained to do so and thus replacement is a costly proposition.

In accordance with the present invention, a coupling member 30 is provided for connecting the handle 40 to the remaining stub shaft 21 thereby eliminating the need to replace the entire tilt mechanism 20 when the shaft breaks. The coupling 30 is a short shaft defining a large first portion and a smaller second portion with respective first and second contiguous portions 31 and 32 that have different outer dimensions, in a direction transverse to the length of the shaft, resulting in a shoulder 33. A socket 34 extends inwardly from the outer free end of the larger diameter portion 31 to receive therein the portion of the shaft 21 that projects from the side of the tilt mechanism. A threaded set screw 35 includes a recess in the end thereof to receive an Allen wrench or the equivalent. The threaded set screw 35 projects into the socket 34 to detachably anchor the coupling to the shaft. The set screw 35 is threaded through a wall of the coupling and is located closely adjacent the free outer end of the coupling. The smaller end portion 32 of the coupling member has a shaft diameter and profile to project into a socket 41 in a conventional replacement handle. In practice and by way of example the shaft end portion 31 has an outer diameters of 0.78 of an inch and the recess in the end thereof has a diameter of 0.50 inches. The smaller end portion 32 has an outer diameter of 0.40 inches. The length of the coupling member is 1.11 inches with the larger end being 0.60 inches in length and the depth of the socket therein 0.42 inches.

In the embodiment illustrated in the drawings, the coupling portion 32 has a pair of oppositely located grooves 37 had 38 disposed parallel to the axis of the coupling member for receiving correspondingly located ribs in the socket 41 in the handle 40 and these prevent the handle from rotating on the shaft. There is a groove 39 on this same coupling portion and which is disposed transverse to the axis of the coupling member. A spring clip in the socket 41 of the handle 40 in a known manner snap fits into this groove to thereby retain the handle on the coupling member. Alternatively, the coupling portion 32 maybe externally threaded to mate with corresponding internal threads in the socket 41 of the handle.

The foregoing makes a simple, inexpensive and essentially unnoticeable repair eliminating the need to replace the entire tilt mechanism.

In the foregoing the coupling member is described as being used to repair a tilt mechanism having a broken shaft. It is also intended that an entire original equipment seat tilt mechanisms be initially provided with a coupling member as described in the forgoing to connect the handle to the lock release shaft. In this case, the shaft initially can be shorter in length than is presently the case and as in the present case the set screw 35 is positioned closely adjacent the free outer end of the coupling member so that it bites into the portion of the lock release shaft that has no weakening slots or holes therein.

Figure 8A:
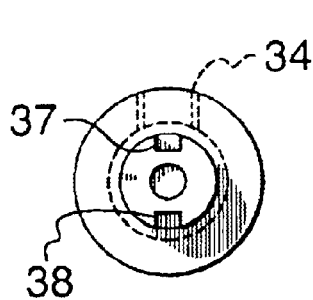
FIG. 8a is a frontal view of an alternate embodiment of a integral one piece coupling member showing the use of internal keeper comprising opposing splines in the larger rear portion of the coupling and an axial exterior groove extending along the surface of the front portion abutting the larger portion whereby a threaded set screw socket or bore is disposed in alignment with one of the splines and the groove and disposed perpendicular thereto.
Figure 8B:
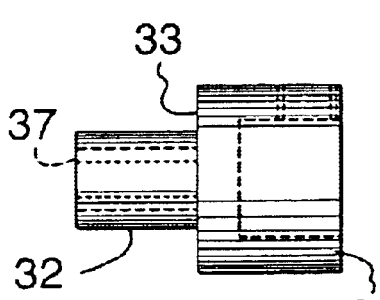
FIG. 8b is a isometric side view of the embodiment of the integral one piece coupling member shown in FIG. 8a, showing the bores formed within the smaller front portion with exterior axial grooves and larger rear portion together with a keeper comprising interior splines, and threaded set screw socket shown in phantom lines in alignment with one of the internal splines and external groove.
Figure 8C:
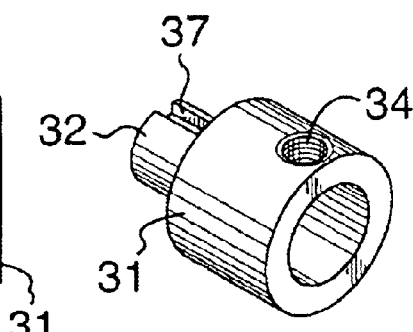
FIG. 8c is a perspective view of the integral one piece coupling member shown in FIGS. 8a and 8b showing the external groove within the smaller front portion abutting the larger rear portion with internal splines forming a keeper and a threaded set screw socket in alignment with the external groove.
Figure 8D:
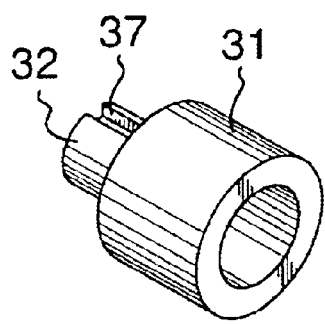
FIG. 8d is a perspective view of a coupling member embodiment showing the axial groove on the smaller portion without a keeper or the threaded set screw socket in the rear portion.
Figure 8E:
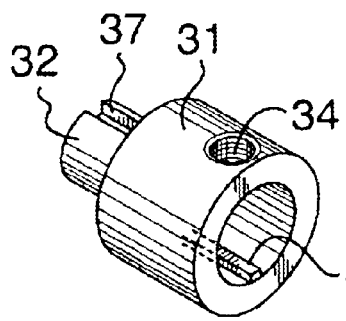
FIG. 8e is a perspective view of a coupling member showing a smaller portion having an axial exterior groove aligned with a threaded set screw socket on the larger portion having a keeper consisting of a spline disposed in the larger portion opposite the threaded set screw socket.
Figure 8F:
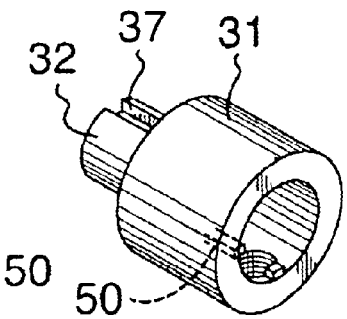
FIG. 8f is a perspective view of a coupling member showing a smaller portion having an axial exterior groove aligned opposite a threaded set screw socket on the larger portion and the keeper consisting of a spline disposed in the larger portion intersecting the threaded set screw socket.

As best shown in FIGS. 8a–8f, the coupling member is an integral one piece coupling member showing the optional use of internal keeper comprising at least one axial spline 50 in the larger portion of the coupling 38 and an axial exterior groove extending along the surface of the smaller portion abutting the larger portion whereby a threaded set screw socket or bore is disposed in alignment with one of the splines and the groove and disposed perpendicular thereto. The bores are shown within the smaller portion and larger rear portion which includes a keeper comprising an optional interior spline and threaded set screw socket, whereby the smaller front portion includes an external groove. As shown in FIG. 8e, an internal spline in the larger portion 31 and the groove 37 in the smaller portion 32 are in alignment with the threaded screw socket. The external groove within the smaller portion may abut the larger portion with the threaded set screw socket in alignment with the external groove and opposite one of the internal splines comprising the keeper. The axial groove may be used on the smaller portion without the keeper or the threaded set screw socket. A smaller portion of the coupling member having an axial exterior groove can also be aligned with a threaded set screw socket on the larger portion and a keeper consisting of a spline disposed in the larger portion opposite the threaded set screw socket. A smaller portion having an axial exterior groove aligned opposite a threaded set screw socket on the larger portion can be utilized with a keeper consisting of a spline may be disposed in the larger portion intersecting the threaded set screw socket.

Figure 9A:
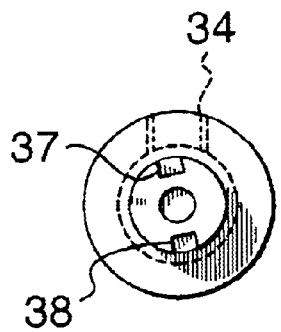
FIG. 9a is a frontal view of an alternate embodiment of a integral one piece coupling member showing the use of a pair of offset external axial grooves in the smaller front portion abutting the larger portion whereby a threaded set screw socket is disposed in offset alignment with one of the grooves and disposed perpendicular thereto whereby the grooves are eccentric and rotated so that that are not in perpendicular alignment with the threaded set screw bore.
Figure 9B:
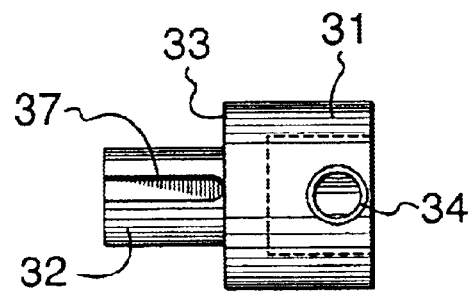
FIG. 9b is a isometric side view of the embodiment of the integral one piece coupling member shown in FIG. 9a, showing the bores formed within the smaller portion and larger portion shown in phantom lines together with an external axial groove offset with respect to the threaded set screw socket.

FIGS. 9a–9b are alternate embodiments of a integral one piece coupling member showing the use of internal keeper comprising offset opposing grooves in the smaller portion of the coupling extending along the surface abutting the larger portion whereby a threaded set screw socket is disposed in offset alignment with one of the splines and the groove and disposed perpendicular thereto whereby the splines are eccentric and rotated so that that are not in perpendicular alignment with the threaded set screw bore.

FIGS. 10a–10c are alternate embodiments of a coupling member showing the smaller portion comprising a frustoconical rear portion 56 abutting a front portion of approximately equal size with a bore therethrough to cooperatively engage a screw, wherein a washer comprising a polymeric material extends coaxially around the front portion and a band extends coaxially around the washer forming the larger portion of the coupling member with a threaded set screw socket disposed through the band, washer, and front portion of the coupling member.

FIGS. 11a–11b are alternate embodiments of a three piece coupling member showing the smaller portion comprising a frustoconical rear portion 56 abutting a front portion of approximately equal size with a bore therethrough to cooperatively engage a screw, wherein a washer 58 comprising a polymeric material extends coaxially around the front portion and a band 60 extends coaxially around the washer forming the larger portion of the coupling member with a threaded set screw socket disposed through the band, washer, and front portion of the coupling member and the castilated end 62 of the frustoconical portion forming slots and projections therearound.

FIGS. 12a–12b are embodiments of a coupling member having a keeper comprising a top spline 64 wherein the front end portion 66 is approximately the same size as the rear end portion 68 and the rear end portion includes a keeper comprising a spline 64 therein.

FIG. 13 is an isometric view of the embodiment of FIG. 12B including a rear truncated portion 56 having a castilated end 62.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A vehicle tilt seat handle repair assembly, comprising:
a vehicle seat including a seat portion and a tilting back portion, said tilting back portion releasing from a locked position by a handle deposed on a side of said seat portion;
a tilt mechanism including a lock release actuating shaft connecting said handle to a lock/release means for releasibly holding said tilting back portion in an upright position with respect to said seat portion and releasing said tilting back portion for pivotal movement from an upright position;
said lock release actuating shaft including a broken off portion of an outer free end portion preventing reconnecting said handle directly to said shaft;
said handle including a socket, said socket including means for cooperating engaging a lock relase actuating shaft for preventing relative movement of the handle and lock release actuating shaft when said handle is moved in a direction to rotate said lock release actuating shaft, said handle including a bore therethrough for extending a fastening means therethrough to cooperatively engage said lock release actuating shaft;
said tilt seat handle repair coupling comprising a first end portion which includes a first bore having an internal diameter large enough to hold a threaded fastener and said first end portion including at least a cylindrical distal end portion having an external diameter less than said socket for projecting into at least a portion of said socket of said handle, said tilt seat handle repair coupling including stop means extending from an interior surface of said bore for abutting a distal end of said broken off portion of an outer free end portion of said lock release actuating shaft, said stop means including an opening for extending said fastener means therethrough for cooperatively engaging said broken off portion of an outer free end portion of said lock release actuating shaft, and said tilt seat handle repair coupling including a opposing second end portion including a bore of greater diameter than the diameter of said lock release actuating shaft for coaxial engagement with said broken off portion of an outer free end portion and means for a cooperatively engaging said second end portion of said tilt seat handle repair coupling with said broken off portion of an outer free end portion of said lock release actuating shaft.

2. The vehicle tilt seat handle repair assembly of claim 1, said stop means defining an annular interior wall having an opening therein for said fastener means to extend therethrough.

3. The vehicle tilt seat handle repair assembly of claim 1, wherein said means for cooperatively engaging said second end portion of said tilt handle repair coupling with said broke off outer free end portion of said lock release actuating shaft is a keeper comprising a spline disposed axially on an internal surface of said bore of opposing second end portion which cooperatively engages a corresponding groove formed on the internal surface of said socket of said handle for cooperating engaging a lock relase actuating shaft for preventing relative movement of the handle and lock release actuating shaft when said handle is moved in a direction to rotate said lock release actuating shaft.

4. A vehicle tilt seat handle repair assembly, comprising:

- a vehicle seat including a seat portion and a tilting back portion, said tilting back portion releasing from a locked position by a handle deposed on a side of said seat portion;
- a tilt mechanism including a lock release actuating shall connecting said handle to a lock/release means for releasibly holding said tilting back portion in an upright position with respect to said seat portion and releasing said tilting back portion for pivotal movement from an upright position;
- said lock release actuating shaft including a broken off portion of an outer free end portion preventing reconnecting said handle directly to said shaft in a maimer to operate said tilt mechanism;
- said handle including a socket, said socket including means for cooperating engaging a lock relase actuating shaft for preventing relative movement of the handle and lock release actuating shaft when said handle is moved in a direction to rotate said lock release actuating shaft, said handle including a bore therethrough for extending a fastening means therethrough to cooperatively engage said lock release actuating shaft;
- said tilt seat handle repair coupling comprising a first small end portion which includes a first threaded bore having an internal diameter large enough to cooperatively engage a threaded fasterner extending through said socket of said handle cooperatively engaging said first threaded bore of said first end portion, said first end portion including at least a cylindrical distal end portion having an external diameter less than said socket for projecting into at least a portion of said socket of said handle, said handle including a keeper comprising a spine disposed axially on an internal surface of said socket bore cooperatively engaging a corresponding axial groove formed in the external surface of said first end portion preventing relative movement of the handle and said first end portion when said handle is moved in a direction to rotate said lock release actuating shaft, said tilt seat handle repair coupling including stop means extending from an interior surface of said bore for abutting a distal end of said broken off portion of an outer free end portion of said lock release, actuating shaft, and said tilt seat handle repair coupling including a opposing larger second end portion including a bore of greater diameter than the diameter of said broken off portion of lock release actuating shaft for coaxial engagement with said broken off portion of an outer free end portion, said second end portion including means for cooperatively engaging said broken off portion of an outer free end portion of said lock release actuating shaft.

5. The vehicle tilt seat handle repair assembly of claim 4, said means for cooperatively engaging said broken off portion of an outer free end portion of said lock release actuating shaft comprises a threaded bore through said larger second end portion disposed normal therethrough and a set screw threadably engaging said threaded bore and said broke off outer free end portion of said lock release actuating shaft disposed withinsaid second end portion holding same.

6. The vehicle tilt seat handle repair assembly of claim 4, said stop means defining an interior wall.

* * * * *